(12) United States Patent
Yogaratnam (10) Patent No.: US 6,513,158 B1
(45) Date of Patent: Jan. 28, 2003

(54) METHOD AND APPARATUS FOR RUNNING MULTIPLE JAVA APPLICATIONS SIMULTANEOUSLY

(75) Inventor: Kumanan Yogaratnam, Ottawa (CA)

(73) Assignee: Espial Group Inc., Ontario (CA)

( * ) Notice: Subject to any disclaimer, the term of this patent is extended or adjusted under 35 U.S.C. 154(b) by 0 days.

(21) Appl. No.: 09/440,175

(22) Filed: Nov. 15, 1999

(51) Int. Cl.[7] .................................................. G06F 9/44
(52) U.S. Cl. ........................ 717/166; 717/100; 345/738
(58) Field of Search .......................... 717/166, 100–119, 717/146–150, 162–165, 167; 345/735, 738, 744, 749; 709/1, 100, 106–107, 310–320, 328–332

(56) References Cited

U.S. PATENT DOCUMENTS

| | | | | |
|---|---|---|---|---|
| 5,283,819 A | * | 2/1994 | Glick et al. .................... | 379/90 |
| 5,727,147 A | * | 3/1998 | Van Hoff ..................... | 709/200 |
| 6,061,695 A | * | 5/2000 | Slivka et al. ............... | 707/513 |
| 6,263,498 B1 | * | 7/2001 | Alcorn et al. ............... | 717/110 |
| 6,311,325 B1 | * | 10/2001 | Levine et al. ............... | 717/128 |
| 6,330,659 B1 | * | 12/2001 | Poff et al. ..................... | 712/34 |
| 6,339,832 B1 | * | 1/2002 | Bowman-Amuah .......... | 714/35 |

* cited by examiner

*Primary Examiner*—Kakali Chaki
*Assistant Examiner*—Hoang-Vu Antony Nguyen-Ba
(74) *Attorney, Agent, or Firm*—Jordan and Hamburg LLP (57) ABSTRACT

An embedded desktop which can run multiple Java applications simultaneously under one instance of a Java™ virtual machine (JVM) and which allows open applications to communicate with one another in a system independent manner. The embedded desktop functionally exists between the JVM and the multiple Java™ applications and consists of a Core and various plug-ins. When applications are launched by a user (by communication between the Core, user interface plug-in and service vendor plug-in), an application class loader for each application is invoked using the class names of the respective applications. By segregating each application into an application class loader, class name collisions and resulting application crashes are avoided. Once application class loaders have been invoked, communication between applications is facilitated through the Core, avoiding the overhead and complexity of system dependent communication through the operating system and associated hardware.

21 Claims, 6 Drawing Sheets

(PRIOR ART)

FIG. 1

(PRIOR ART)

FIG. 2

(PRIOR ART)

METHOD AND APPARATUS FOR RUNNING MULTIPLE JAVA APPLICATIONS SIMULTANEOUSLY

BACKGROUND TO THE INVENTION

The present invention relates to the field of Internet information appliances and more particularly to a method and apparatus for running a plurality of applications on such appliances in a platform independent environment.

DESCRIPTION OF THE RELATED PRIOR ART

Figure 1:
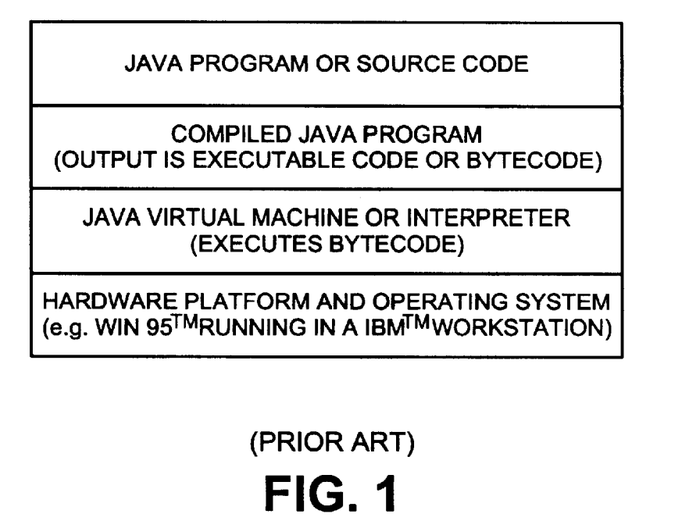
FIG. 1 is a model of a traditional stack associated with the JAVA based platform.

Traditionally, software applications have been built for a particular operating system working with a particular configuration of computer hardware e.g. WORDPERFECT for WINDOWS 95 operations on an IBM (or clone) computer with a PENTIUM chip integral to the motherboard. This system dependent programming resulted in applications which required significant programming code and storage space on a hard drive or similar storage medium to warehouse the application. In an attempt to move away from a dependency on a particular hardware and operating system configuration, the JAVA programming language was developed. JAVA allows applications to be run on any hardware platform without having to be rewritten or recompiled by the programmer for each separate platform. Further, JAVA can be used to create complete applications that may run on a single computer or be distributed among servers and clients in a network such as the Internet. The programs created using JAVA are portable in a network meaning that once the program is compiled into JAVA bytecode it can be run anywhere in a network on a server or client that has a JAVA interpreter or JAVA virtual machine (JVM). The JVM is an abstract computer (i.e. actually a software layer) that provides an interface between compiled JAVA binary code and the hardware platform which actually performs the programs instructions. Once a JVM has been provided for a platform, any JAVA program can run on the platform. Diagrammatically, this can be described as shown in FIG. 1.

JAVA is an object-oriented programming language which means, among other characteristics, that similar objects can take advantage of being part of the same class and inherit common code. An object is what is actually run in the computer. It contains programming code (sequences of computer instructions) and data (information which the instructions operate on). Traditionally, code and data have been kept apart (e.g. In the C language, units of code are called functions, while units of data are called structures. Functions can operate on more than one type of structure, and more than one function can operate on the same structure). All communication to an object is done via messages which define the interface to the object i.e. the internal data and code of the object cannot be accessed directly. An object is defined by its class, with a class being a template definition of the methods and variables in a particular kind of object. Objects are individual instances of a class, containing real values instead of variables. Each object is made into a generic class of objects and even more generic classes are defined so that objects can share models and reuse the class definitions in their code. Variables are data types which are not assigned a constant value, while a method is the action or programmed procedure that a message carries out. A method is defined as part of a class and included in any object of that class. The object's methods are designed to handle the actual values that are supplied to the object when the object is being used. Arguments are often supplied as part of a message. For example, consider the following example expressed in SMALLTALK, an object-oriented programming language similar to JAVA:

a:=1.
b:=2.
c.:=a+b

In this example, the code specifies: "Take object a, which has a value of 1, and send it the message "+", which included the argument b, which in turn, has the value 2. Object a, receives this message and performs the action requested, which is to add the value of the argument to itself. Create a new object, give this the result 3, and assign this object to c."

JAVA code is robust meaning that JAVA objects contain no references to data external to themselves or other known objects. This ensures that an instruction cannot contain the address of data stored in another application or in the operating system itself, either of which could cause the program to crash, in the event that such data was inaccessible. In JAVA programming, there are application programs and compact programs called applets. An application program is a program designed to perform a specific function directly for the user or, in some cases, for another application program (e.g. word processors, Web browsers, etc.). Applications use the services of the computer's operating system and other supporting applications. The formal requests and means of communicating with other programs that an application program uses is called the application program interface (API). On the other hand, an applet is a small program that can be sent along with a Web page to a user. JAVA applets can perform interactive animations, immediate calculations, or other simple tasks without having to send a user request back to the server. Web browsers that support JAVA are able to download the applet to the user's hardware and then execute it i.e. the executable software is downloaded when you need it and then discarded when the program has been executed.

Practically speaking, the major software manufactures have built a JVM into their operating systems and/or Web browsers to allow JAVA applications or applets to run e.g. a WINDOWS machine will have a JAVA interpreter for the WINDOWS/INTEL/IBM environment, an APPLE MAC will have a MAC-JAVA interpreter, etc. An example of such software would be the web browser NETSCAPE.

Figure 2:
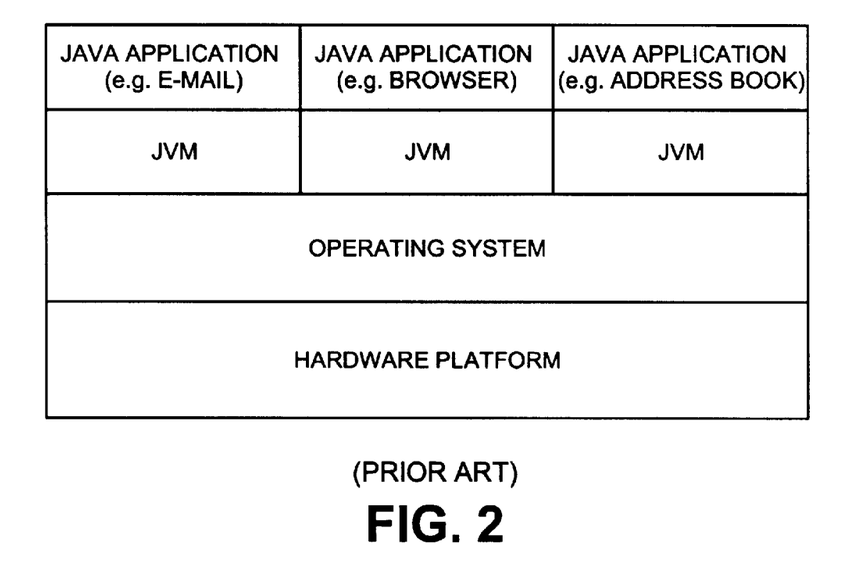
FIG. 2 is a model of a traditional stack in a multi-JAVA application environment.
Figure 3:
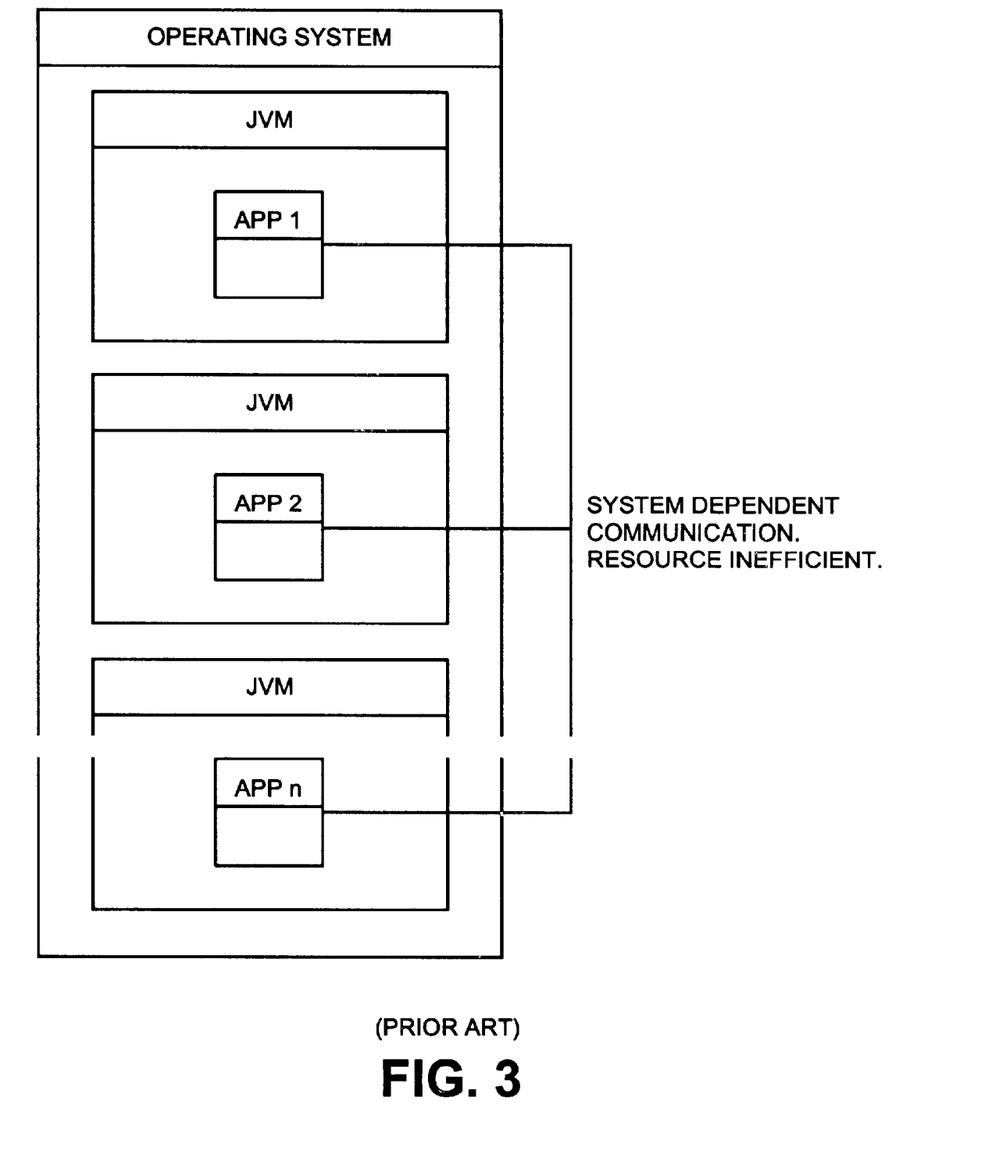
FIG. 3 is a model of the traditional operating system, JVM and application relationship.

Presently, when a user desires to use multiple JAVA applications they must invoke separate JAVA interpreters. As shown in FIG. 2, in the traditional model each JAVA application has its own associated JVM which must be run (instantiated) as a system process to run the application with which it is associated. This is considered inefficient because the applications must share the same memory and other resources of the information appliance in which they are operating. Further, each application runs independent of the other resulting in inefficient inter-application communication. Instead of being able to communicate at the application level, virtual communication paths must be created which engage the Operating Systems level. As a result, the manner in which applications communicate is very system dependent. A diagrammatic view of this traditional configuration is shown at FIG. 3.

SUMMARY OF INVENTION STATEMENT

The present invention seeks to overcome the disadvantages of the prior art by providing an embedded desktop which can run multiple applications simultaneously under one instance of a JVM and which allows open applications to communicate with one another in a system independent manner.

In accordance with one aspect of the present invention, there is provided a computer implemented method of running multiple JAVA applications under one instance of a JAVA Virtual Machine comprising the steps of: invoking a system class loader when the JAVA Virtual Machine is launched; launching an embedded desktop comprising a core and at least a service vendor plug-in, wherein the embedded desktop communicates with the JAVA Virtual Machine and each of the multiple JAVA applications, receiving a request into the core to launch one of the multiple JAVA applications; retrieving into the core class files associated with the requested JAVA application; invoking an application class loader corresponding to the requested JAVA application; hooking the application class loader into the system class loader; opening the requested JAVA application; updating an open application list after the requested JAVA application is opened.

In accordance with another aspect of the present invention there is provided in a computer comprising storage means, input means, a central processing unit, an operating system and a JAVA Virtual Machine, an embedded desktop for running a plurality JAVA applications under one instance of said JAVA Virtual Machine, the embedded desktop stored in the storage means and comprising at least: a core; and a service vendor plug-in communicating with the core; wherein the embedded desktop communicates with the JAVA Virtual Machine and the plurality of JAVA applications, each of the plurality of JAVA applications containing class files; and wherein a system class loader is invoked when the JAVA Virtual Machine is launched; and wherein an application class loader is invoked when each of the plurality of JAVA applications is launched, using the respective class files of each of the plurality of JAVA applications; and wherein the application class loader is hooked to the system class loader; and wherein an open application list is updated after each of the plurality of JAVA applications is launched.

In yet another aspect of the present invention there is provided a method for allowing a plurality of JAVA applications running under one instance of a JAVA Virtual Machine to communicate with each other in a system independent manner comprising the steps of: invoking a system class loader when the JAVA Virtual Machine is launched; launching an embedded desktop comprising a core and at least a service vendor plug-in, wherein the embedded desktop communicates with a JAVA Virtual Machine and a plurality of JAVA applications; invoking a respective application class loader when each of the plurality of JAVA applications is launched; receiving a request into the core from one of the application class loaders; polling each of the applications; and presenting the results of the poll to the requesting application class loader.

BRIEF DESCRIPTION OF THE DRAWINGS

A better understanding of the invention will be obtained by reading the description of the invention below, with reference to the following drawings, in which.

DESCRIPTION OF THE PREFERRED EMBODIMENT

Figure 4:
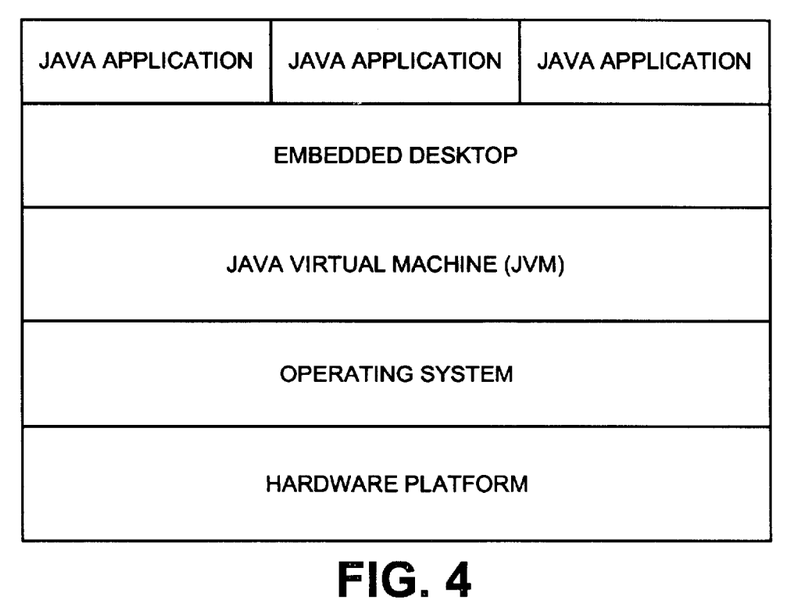
FIG. 4 is a model of the stack incorporating an embedded desktop.
Figure 5:
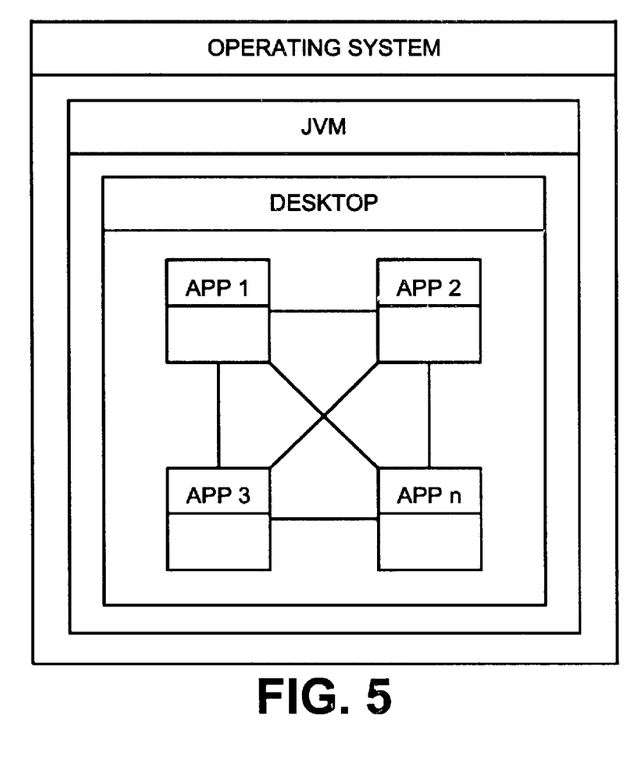
FIG. 5 is a model of the operating system, embedded desktop, JVM and application relationship in accordance with the present invention.

FIGS. 4 and 5 depict the relationship of the hardware platform, operating system, embedded desktop, JVM and JAVA applications in accordance with the present invention. As will be explained below, through the introduction of the embedded desktop, only one instance of a JVM is required to be run, regardless of the number of JAVA applications which have been launched. Further, the JAVA applications which are running are able to easily communicate in a system independent manner. The embedded desktop can be implemented on any information appliance which is configured as described in FIG. 4. Such information appliances include, but are not limited to, workstations, cellular phones, and personal digital assistants such as 3Com's PALM PILOT or APPLE'S NEWTON.

As will be appreciated by those skilled in the art, the expression "hardware platform" used in the drawings is a generic term used to describe the main physical components of an information appliance. In general, such information appliances comprise a bus for communicating instructions, a processor coupled to the bus for processing the instructions, random access memory coupled with the bus for storing volatile information and instructions for the processor, read only memory coupled to the bus for storing static information and instructions for the processor, a display device (shown as 20 in FIG. 6) coupled with the bus for displaying information to a user, an alphanumeric input device coupled with the bus for communicating information and command selections to the processor, and a mass storage device (shown as 22 in FIG. 6) for storing information and instructions. The processor may be any of a wide variety of general purpose processors or microprocessors such as the SPARC manufactured by Sun Microsystems or the PENTIUM manufactured by Intel Corporation. The display device may be a liquid crystal display, cathode ray tube or the like, while the mass storage device includes, but is not limited to, a hard disk, floppy disk, optical storage device or the like.

The preferred embodiment of the present invention is implemented as a software module, which may be executed in a conventional manner on an information appliance as described above. The embedded desktop is stored in read only memory and subsequently loaded into and executed by the processor integral to the information appliance. Once initiated, the software of the preferred embodiment operates in the manner which will be described below.

Figure 6:
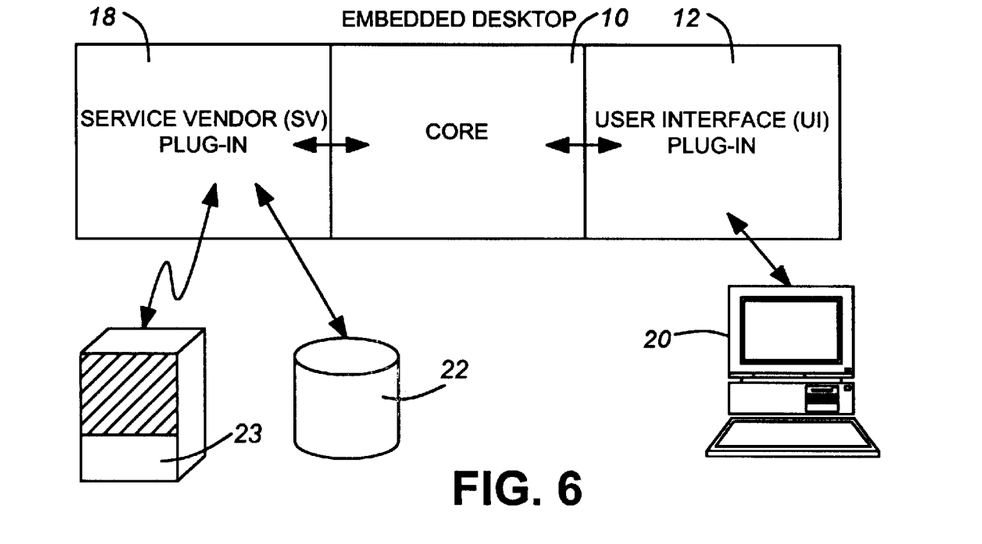
FIG. 6 is a diagrammatic overview of an embedded desktop.
Figure 7:
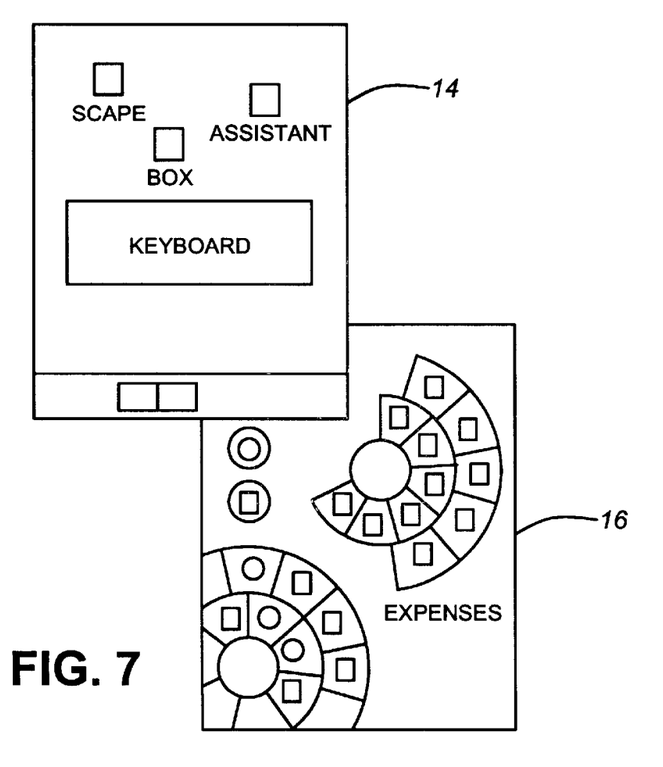
FIG. 7 is a pictorial representation of a graphical user interface (GUI) associated with an embedded desktop.

FIG. 6 is a diagrammatic overview of the embedded desktop in accordance with the present invention. An embedded desktop serves to manage all aspects of the operating environment and incorporates such user aids as an application launcher, input device manager and a remote application deployment manager (RADM). An application launcher manages applications and provides users with a method to access applications and document shortcuts. An input device manager allows users to select the input device of their choice. Finally, the RADM allows users to download or receive subscription software and install it as well as providing device manufacturers and content developers the ability to upgrade their device software transparently and remotely. In general, the embedded desktop comprises a kernel or Core 10 with hooks to a variety of plug-ins. One such example of a plug-in is the "look-and-feel" or user interface (UI) plug-in 12 which allows the user to integrate their own GUI or adopt the standard GUI provided with the embedded desktop. FIG. 7 depicts a standard GUI 14 and a customized GUI 16 available through an embedded desktop. It is important to note that the embedded desktop has a relatively small footprint of approximately 50 Kilobytes and is generally stored in the ROM of the information appliance in which it is installed, although other storage medium would also be satisfactory. Despite the small footprint, the embedded desktop provides the full functionality normally associated with much larger (10Mbyte) desktop managers.

The present invention focuses on the relationship of the Core 10 and two plug-ins, the user interface (UI) plug-in 12 previously discussed and the service vendor (SV) plug-in 18. The UI plug-in 12 is typically configured to communicate with a display device 20 while the SV plug-in is typically configured to communicate with a local mass storage device 22 or remote network server or device 23 which stores applications to be loaded.

Figure 8:
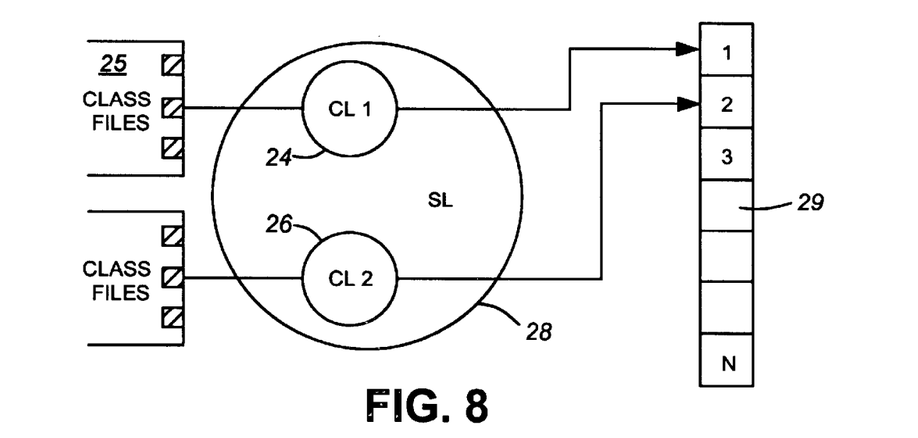
FIG. 8 is a diagrammatic representation of the class loading scheme of the present invention.

As shown in FIG. 8, one critical function of the Core 10 is to manage all applications as specified by the service vendor plug-in 18. As indicated above, applications may be launched from a local hard drive or from a remote server situated within a network. Applications could be written by the same vendor but typically a user runs applications which have been programmed by a variety of different commercial software providers. There exists the possibility that the programmer could inadvertently use a class name which has been used by another programmer producing another application which the user desires to run on their information appliance. Under the JAVA specification, there is no guarantee of distinctive naming between applications. In the event of a class name overlap, if these applications are run on only a single JVM, a namespace collision will occur which could ultimately crash the applications. In order to avoid such collisions the present invention takes advantage of the concept of a class loader, well known in the JAVA specification. When an application is launched, the Core invokes an application class loader 24 for that first application by retrieving the class files 25 associated with that application. Similarly, if a second application is launched, a second application class loader 26 is invoked. This procedure is repeated for each application that is launched. A separate system class loader 28 is also invoked by the JVM to load the embedded desktop itself. As each application class loader is invoked, an open application list 29 is maintained in the Core.

Figure 9:
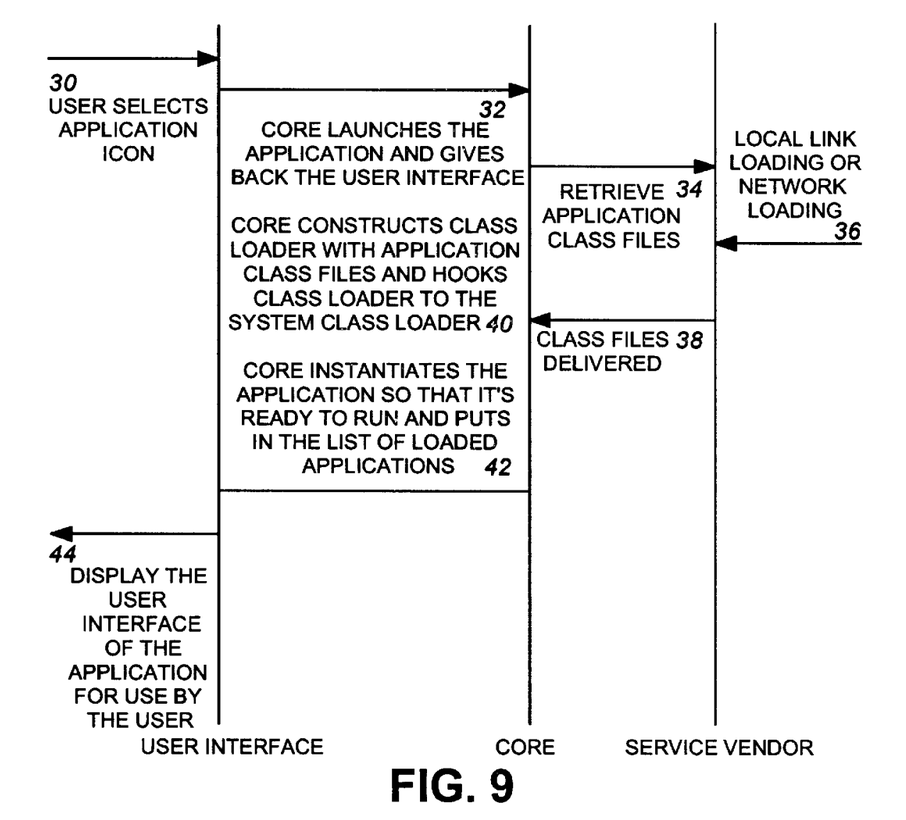
FIG. 9 is a message flow chart defining the sequence of steps in the class loading process.

FIG. 9 describes the sequence of steps which are performed on startup of an application. At step 30 the user selects an application icon presented on a display screen. At step 32, the Core launches the application selected and gives back the user interface for the application. At step 34, the Core retrieves application class files from the application. As shown at step 36, this requires that the service vendor locate and extract the class files from either a local storage device or a remote server in a network where the application is resident. At step 38, the class files are delivered by the service vendor to the Core. At step 40 the Core constructs the application class loader using the application class files and hooks the class loader to the system class loader which was invoked when the embedded desktop was launched. At step 42 the Core instantiates the application so that it's ready to run and updates a list of loaded applications. Finally, at step 44, the user interface for the application is presented to the user.

Figure 10:
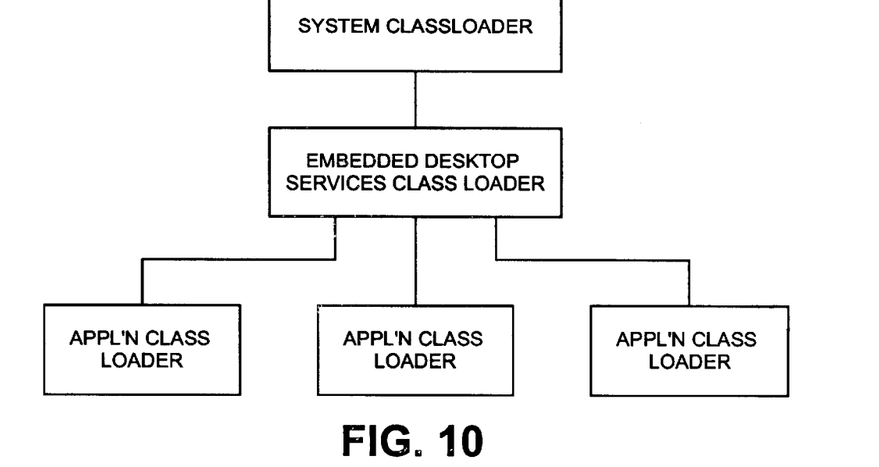
FIG. 10 is a chart depicting the relationship between the application, class services, and systems class loaders.

In the preferred embodiment there is also invoked a services class loader, to facilitate access to service classes defined by the various applications. In the same manner that the user applications invoke an application class loader, a services class loader is invoked when a service application is launched. FIG. 10 defines the hierarchical nature of the class loaders. Operationally, if an application class loader needs to communicate with the system class loader, it would have to communicate first with the service class loader.

It will be understood by those skilled in the art that separate application class loaders need not be invoked where there is some level of assurance that there will not be any namespace collisions. This could arise, for example, if a user has adopted software written by the same vendor who has ensured that classes associated with each application are named differently. Alternately, if the software vendors adhere to a naming guideline to avoid similar class names, then separate application class loaders need not be invoked. The ability to eliminate the use of application class loaders may be important where memory is limited in the information appliance into which the embedded desktop is loaded.

It will also be understood by those skilled in the art that a user interface plug-in 12 and display device 20, as described in relation to FIG. 6, need not be included for the present invention to operate effectively. For example, where JAVA applications are automatically invoked on startup and do not require interaction with a user, the user interface plug-in 12 and associated display device 20 can be eliminated, with the embedded desktop maintaining full functionality including class name collision avoidance.

Figure 11:
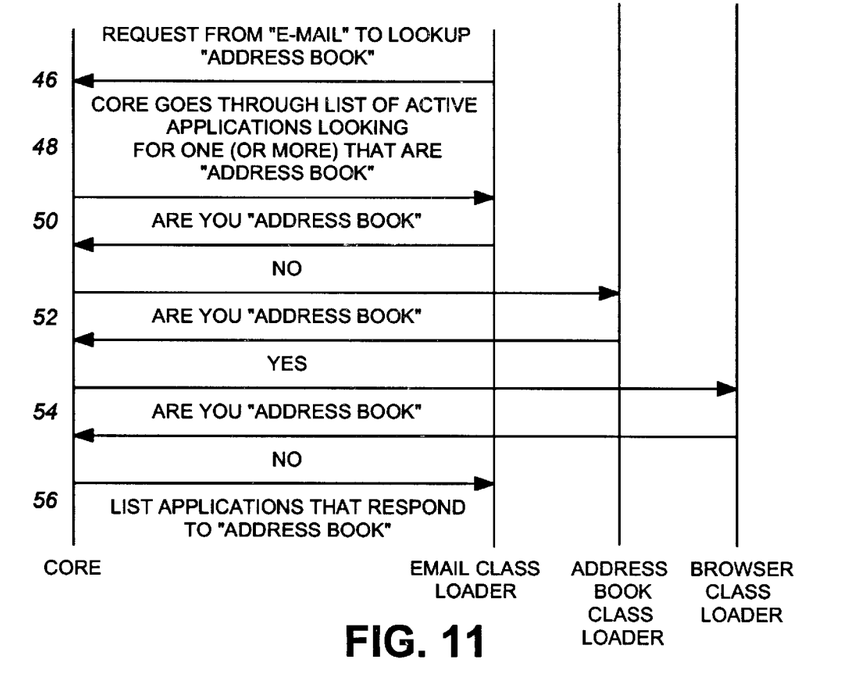
FIG. 11 is a message flow chart defining the sequence of steps in an inter-application communication.

Once the class loader structure is established, communication between applications is able to be managed at the desktop level through the Core. FIG. 11 is a message flow diagram demonstrating, for a specified example, how communication between open JAVA applications occurs at the embedded desktop level. First we assume that three JAVA applications are running—e-mail, address book, and web browser. If the e-mail application requires an address, at step 46 it polls the Core. At step 48, the Core retrieves the open application list and sequentially polls (at steps 50, 52 and 54) each open application to determine if one or more of them are "address book". At step 56, the list of applications which have responded positively to the Core's poll is given to the e-mail application for processing.

The advantages of the present invention are now readily apparent:

(a) multiple applications can now be run under one instance of a JVM;
(b) there is a separation of namespaces so that the application class names do not collide;
(c) sandboxing (compartmentalizing) is introduced so that applications cannot adversely affect each other;
(d) there is a sharing of resources across applications; and
(e) communication between applications is not system dependent.

A person skilled in the art may now conceive of alternate structures and embodiments or variations of the above. All those which fall within the scope of the claims appended hereto are considered to be part of the present invention.

The embodiments of the invention in which an exclusive property or privilege is claimed are defined as follows:

1. A computer implemented method of running multiple applets under one instance of a virtual machine for executing an applet comprising the steps of:

(a) invoking a system class loader when said virtual machine for executing an applet is launched;
(b) launching an embedded desktop comprising a core and at least a service vendor plug-in, wherein said embedded desktop communicates with said virtual machine for executing an applet and each of said multiple applets;
(c) receiving a request into said core to launch one of said multiple applets;

(d) retrieving into the core class files associated with said requested applet;

(e) invoking an application class loader corresponding to said requested applet;

(f) hooking said application class loader into said system class loader;

(g) opening said requested applet; and (h) updating an open application list after said requested applet is opened.

2. The method of claim 1 wherein said embedded desktop further includes a user interface plug-in.

3. The method of claim 2 further including the step of presenting the user interface of said open applet to a display screen.

4. The method of claim 1 further including the step of invoking a services class loader using class files associated with a service application.

5. The method of claim 1 wherein said embedded desktop is stored in a read only memory.

6. The method of claim 1 wherein said multiple applets are stored locally in an optical storage device or remotely at a server in a network.

7. In a computer comprising storage means, input means, a central processing unit, an operating system and a virtual machine for executing an applet, an embedded desktop for running a plurality of applets under one instance of said virtual machine for executing an applet, said embedded desktop stored in said storage means and comprising at least:

(a) a core; and (b) a service vendor plug-in communicating with said core;

wherein said embedded desktop communicates with said virtual machine for executing an applet and said plurality of applets, each of said plurality of applets containing class files;

and wherein a system class loader is invoked when said virtual machine for executing an applet is launched;

and wherein an application class loader is invoked when each of said plurality of applets is launched, using the respective class files of each of said plurality of applets, and wherein said application class loader is hooked to said system class loader;

and wherein an open application list is updated after each of said plurality of applets is opened.

8. The embedded desktop of claim 7 wherein said computer further includes display means and said embedded desktop further includes a user interface plug-in.

9. The embedded desktop of claim 7 wherein a services class loader is also invoked when a service application communicating with said embedded desktop is launched using class files contained in said service application.

10. The embedded desktop of claim 7 wherein said storage means includes read only memory and said embedded desktop is stored in said read only memory.

11. The embedded desktop of claim 7 wherein said storage means includes an optical storage device and said plurality of applications are resident locally in said optical storage device or remotely at a server in a network.

12. A computer-readable medium having stored thereon, computer-executable instructions which, when executed by a processor, cause the processor to perform the steps of:

(a) invoking a system class loader when a virtual machine for executing an applet is launched;

(b) launching an embedded desktop comprising a core and at least a service vendor plug-in, wherein said embedded desktop communicates with a virtual machine for executing an applet and a plurality of applets;

(c) receiving a request into said core to launch one of said plurality of applets;

(d) retrieving into the core class files associated with said requested applet;

(e) invoking an application class loader corresponding to said requested applet;

(f) hooking said application class loader into said system class loader;

(g) opening said requested applet; and (h) updating an open application list after said requested applet is opened.

13. The computer-readable medium of claim 12 wherein said embedded desktop further includes a user interface plug-in.

14. The computer-readable medium of claim 13 wherein said computer-executable instructions further include the step of presenting the user interface of said open applet to a display screen.

15. The computer-readable medium of claim 12 wherein said computer-executable instructions further include the step of invoking a services class loader using class files associated with a service application.

16. The computer-readable medium of claim 12 wherein said computer-readable medium is a read only memory.

17. The computer-readable medium of claim 12 wherein said multiple applets are stored locally in an optical storage device or remotely at a server in a network.

18. A method for allowing a plurality of applets running under one instance of a virtual machine for executing an applet to communicate with each other in a system independent manner comprising the steps of:

(a) invoking a system class loader when said virtual machine for executing an applet is launched;

(b) launching an embedded desktop comprising a core and at least a service vendor plug-in and a user-interface vendor plug-in, wherein said embedded desktop communicates with said virtual machine for executing an applet and said plurality of applets;

(c) invoking a respective application class loader when each of said plurality of applets is launched;

(d) receiving a request into said core from one of said application class loaders;

(e) polling each of said applets; and (f) communicating the results of said poll to the requesting application class loader.

19. The method of claim 18 further including the step of invoking a services class loader using class files associated with a service application.

20. The method of claim 18 wherein said embedded desktop is stored in a read only memory.

21. The method of claim 18 wherein said plurality of applets are stored locally in an optical storage device or remotely at a server in a network.

* * * * *